United States Patent
Zhou et al.

(10) Patent No.: US 11,219,949 B2
(45) Date of Patent: Jan. 11, 2022

(54) METHOD FOR PROMOTING DENSIFICATION OF METAL BODY BY UTILIZING METAL EXPANSION INDUCED BY HYDROGEN ABSORPTION

(71) Applicant: CENTRAL SOUTH UNIVERSITY, Changsha (CN)

(72) Inventors: ChengShang Zhou, Changsha (CN); Yong Liu, Changsha (CN); Pei Sun, Changsha (CN); Bin Liu, Changsha (CN)

(73) Assignee: CENTRAL SOUTH UNIVERSITY, Changsha (CN)

( * ) Notice: Subject to any disclaimer, the term of this patent is extended or adjusted under 35 U.S.C. 154(b) by 0 days.

(21) Appl. No.: 16/979,871

(22) PCT Filed: Mar. 15, 2019

(86) PCT No.: PCT/CN2019/078357
§ 371 (c)(1),
(2) Date: Sep. 11, 2020

(87) PCT Pub. No.: WO2019/205830
PCT Pub. Date: Oct. 31, 2019

(65) Prior Publication Data
US 2021/0023625 A1  Jan. 28, 2021

(30) Foreign Application Priority Data
Apr. 25, 2018 (CN) .......................... 201810378341.0

(51) Int. Cl.
*B22F 3/15* (2006.01)
*B22F 10/00* (2021.01)
*B33Y 10/00* (2015.01)

(52) U.S. Cl.
CPC .............. *B22F 3/156* (2013.01); *B22F 10/00* (2021.01); *B22F 2003/153* (2013.01); *B22F 2998/10* (2013.01); *B22F 2999/00* (2013.01); *B33Y 10/00* (2014.12)

(58) Field of Classification Search
CPC ........ B22F 3/15; B22F 7/00; B22F 2201/013; B22F 3/101
See application file for complete search history.

(56) References Cited

U.S. PATENT DOCUMENTS 4,310,601 A * 1/1982 Bernauer .............. C01B 3/0078
428/566
5,137,665 A * 8/1992 Tarry ................. C04B 35/58071
264/664
(Continued)

FOREIGN PATENT DOCUMENTS

CA   3029174 A1 * 6/2018 ........... C22C 1/0491
CN   1404948 A * 3/2003
(Continued)

OTHER PUBLICATIONS

CN-1404948-A Machine Translation (Year: 2003).*
JP-2000016871-A Machine Translation (Year: 2000).*

*Primary Examiner* — Jacob J Cigna
*Assistant Examiner* — Michael W Hotchkiss
(74) *Attorney, Agent, or Firm* — Bayramoglu Law Offices LLC

(57) ABSTRACT

Provided is a method for promoting densification of a metal body by utilizing metal expansion induced by hydrogen absorption. The hydrogen absorption expansion refers to a volume expansion effect produced by absorbing hydrogen on some metal blocks or metal powder in a hydrogen atmosphere under certain temperature conditions. Hydrogen is introduced into a rigid closed mold filled with a hydrogen absorption expansion material or filled with the hydrogen absorption expansion material and a material to be densified, (Continued)

and the mold and/or the material to be densified are/is densified by using the volume expansion effect of the hydrogen absorption expansion material. The present method may be used for eliminating residual pores from a metal material so as to improve the properties of the material.

9 Claims, 1 Drawing Sheet

(56) References Cited

U.S. PATENT DOCUMENTS

| | | | | |
|---|---|---|---|---|
| 5,447,582 | A * | 9/1995 | Eylon | C22F 1/183 |
| | | | | 148/669 |
| 9,196,403 | B2 * | 11/2015 | Maeda | H01F 1/0573 |
| 9,777,347 | B2 * | 10/2017 | Moxson | B22F 3/18 |
| 9,816,157 | B2 * | 11/2017 | Fang | C22C 1/0458 |
| 10,566,117 | B2 * | 2/2020 | Takeda | C22C 38/06 |
| 2012/0058002 | A1 * | 3/2012 | Ivasishin | B22F 3/1039 |
| | | | | 419/28 |
| 2014/0255240 | A1 * | 9/2014 | Fang | B22F 3/101 |
| | | | | 419/29 |

FOREIGN PATENT DOCUMENTS

| | | |
|---|---|---|
| CN | 1404948 A | 3/2003 |
| CN | 102044680 A | 5/2011 |
| CN | 103624995 A | 3/2014 |
| CN | 104511595 A | 4/2015 |
| DE | 102015212192 A1 | 1/2016 |
| JP | 2000016871 A * | 1/2000 |

\* cited by examiner

METHOD FOR PROMOTING DENSIFICATION OF METAL BODY BY UTILIZING METAL EXPANSION INDUCED BY HYDROGEN ABSORPTION

CROSS REFERENCE TO THE RELATED APPLICATIONS

This application is the national phase entry of International Application No. PCT/CN2019/078357, filed on Mar. 15, 2019, which is based upon and claims priority to Chinese Patent Application No. 201810378341.0, filed on Apr. 25, 2018, the entire contents of which are incorporated herein by reference.

TECHNICAL FIELD

The present invention relates to a densification method for metal, or alloy or metal-based composite materials, and more particularly, to a method for promoting densification of a metal body by utilizing metal expansion induced by hydrogen absorption.

BACKGROUND

During processing of a metal material, certain pores are often formed inside the material. Shrinkage defects and gas pores often exist in cast alloy. For materials fabricated by powder metallurgy, sintered bodies of many material systems have residual pores. According to reports, additive manufacturing-fabricated metal materials have pores due to the raw materials and processes. In the metal welding process, micropores or defects formed at welding seams are serious problems. In addition, during the preparation of composite metal materials, interfacial reactions may lead to the formation of pores. The pores in the metal materials are one of the main defects affecting the properties of products, and directly affect the mechanical properties of the products, resulting in the failure of the materials.

Pore defects in conventional metal materials (such as steel, titanium alloy and aluminum alloy) can be removed by metal plastic processing methods. For materials fabricated by powder metallurgy, additive manufacturing-fabricated metal materials and the like with near-net shaping requirements, high-cost technologies such as hot isostatic pressing, hot pressing sintering and spark plasma sintering need to be adopted to eliminate the pore defects in the products.

Hot isostatic pressing is a sintering method based on the joint action of high temperature and high-pressure gas, can prepare full density materials with uniform microstructures by applying high-pressure gas to make materials be uniformly stressed in each direction, but has the disadvantages of assembly difficulty, high costs and low efficiency. Hot pressing sintering is a sintering method of filling powder materials into a mold and then performing pressing and heating at the same time in the axial direction. The hot pressing sintering is likely to cause anisotropy of products as well as limited production efficiency and product size. On the basis of hot pressing sintering, spark plasma sintering additionally introduces a pulse current to promote sintering densification and can complete sintering of full density materials within a very short period of time, but has the disadvantages of limited product size and high difficulty in large-scale production. Therefore, the above technologies all have the disadvantages of high costs, low efficiency, and limited product size.

SUMMARY

Technical Problem

Through studies, it has been discovered that many metals and alloys react with hydrogen under certain conditions, have functions of storing and releasing the hydrogen and are used as a hydrogen storage function material. However, in the hydrogen absorption reaction process of metal, as crystal lattice parameters change, an obvious volume expansion occurs. For example, after metallic titanium absorbs hydrogen and is completely converted into titanium hydride, the volume expansion may reach 15% or higher. The expansion phenomenon resulting from hydrogen absorption by metal may generate large stress, which, if not properly constrained, may lead to deformation, cracking and pulverization of bulky materials.

Technical Solution

Based on the above discovery and drawbacks in the prior art, the present invention provides a method for promoting densification of a metal body by utilizing metal expansion induced by hydrogen absorption.

According to the method for promoting densification of a metal body by utilizing metal expansion induced by hydrogen absorption of the present invention, hydrogen is introduced into a rigid closed mold filled with a hydrogen absorption expansion material or filled with the hydrogen absorption expansion material and a material to be densified, and the mold and/or the material to be densified are/is densified by using the volume expansion effect of the hydrogen absorption expansion material.

According to the method for promoting densification of a metal body by utilizing metal expansion induced by hydrogen absorption of the present invention, the hydrogen absorption expansion material includes metal with hydrogen absorption capability.

The method for promoting densification of a metal body by utilizing metal expansion induced by hydrogen absorption of the present invention includes the following steps:

step 1:

putting a pre-densified metal body A into a mold, performing encapsulation and fastening, and reserving a gas opening to obtain a pretreatment assembly, wherein the pre-densified metal body A includes metal with hydrogen absorption capability; in the pretreatment assembly, an outer wall of the pre-densified metal body A is in contact with an inner wall of the mold, or a gap exists between the outer wall of the pre-densified metal body A and the inner wall of the mold; and the gap is smaller than linear expansion after the pre-densified metal body A absorbs hydrogen, or charging a pre-densified metal body B and hydrogen absorbable metal powder into a mold together, performing encapsulation and fastening, and reserving a gas opening to obtain a pretreatment assembly, or charging hydrogen absorbable metal powder into a mold, performing encapsulation and fastening, and reserving a gas opening to obtain a pretreatment assembly, or putting metal powder to be densified onto a set position of a mold inner cavity, putting hydrogen absorbable metal powder onto other positions of the mold inner cavity, performing encapsulation and fastening, and reserving a gas opening to obtain a pretreatment assembly, wherein the mold is a rigidmold;

step 2:

putting the pretreatment assembly obtained in the step 1 into a sintering furnace, introducing hydrogen, raising a temperature to a hydrogen absorption temperature, and performing heat soaking to obtain a hydrogenated assembly, then, regulating an atmosphere into an inert atmosphere or a vacuum atmosphere and/or performing heat soaking at a dehydrogenation temperature so that the hydrogenated assembly releases hydrogen to obtain the dehydrogenated assembly; and step 3:

after the dehydrogenated assembly is cooled, removing the mold to obtain a densified metal body.

According to the method for promoting densification of a metal body by utilizing metal expansion induced by hydrogen absorption of the present invention, in heating and hydrogen absorption processes of the encapsulated mold, each component of the mold keeps tight and firm without loosening.

According to the method for promoting densification of a metal body by utilizing metal expansion induced by hydrogen absorption of the present invention, after complete hydrogen absorption by the metal material with hydrogen absorption capability or the hydrogen absorbable metal powder, at least more than 5% volume expansion is realized compared with that before the hydrogen absorption.

According to the method for promoting densification of a metal body by utilizing metal expansion induced by hydrogen absorption of the present invention, in the heating hydrogen absorption process, after complete hydrogen absorption by the metal material with hydrogen absorption capability or the hydrogen absorbable metal powder, a volume expansion proportion is greater than an expansion proportion of a rigid mold inner cavity.

According to the method for promoting densification of a metal body by utilizing metal expansion induced by hydrogen absorption of the present invention, a material of the mold does not react with hydrogen.

According to the method for promoting densification of a metal body by utilizing metal expansion induced by hydrogen absorption of the present invention, a material of the mold is preferably at least one of heat-resistant steel, high-temperature-resistant stainless steel, high-temperature alloy and high-temperature and high-strength ceramics.

According to the method for promoting densification of a metal body by utilizing metal expansion induced by hydrogen absorption of the present invention, the metal material with hydrogen absorption capability or the hydrogen absorbable metal powder absorbs hydrogen at a hydrogen absorption temperature under the condition that a hydrogen partial pressure is greater than or equal to a hydrogen equilibrium partial pressure of the hydrogen absorbable metal or the hydrogen absorbable metal powder. The hydrogen absorption temperature is determined by physicochemical properties of the selected metal material with hydrogen absorption capability and/or the hydrogen absorbable metal powder. During industrial application, the hydrogen absorption temperature is 0.7 times lower than or equal to a melting point of the pre-densified metal body. Its optimum selection is to possibly realize the maximum hydrogen absorption capacity.

According to the method for promoting densification of a metal body by utilizing metal expansion induced by hydrogen absorption of the present invention, the hydrogen absorption temperature is determined by physicochemical properties of the selected metal material with hydrogen absorption capability and/or the hydrogen absorbable metal powder. The hydrogen absorption temperature is lower than a melting point of the pre-densified metal body, and is preferably 0.7 times lower than or equal to the melting point of the pre-densified metal body.

According to the method for promoting densification of a metal body by utilizing metal expansion induced by hydrogen absorption of the present invention, after the hydrogen absorption metal material absorbs hydrogen, absorbed hydrogen may be completely removed through a process of heating or hydrogen partial pressure reduction.

According to the method for promoting densification of a metal body by utilizing metal expansion induced by hydrogen absorption of the present invention, the steps 1, 2 and 3 are sequentially repeated until a product with a desired density is obtained.

According to the method for promoting densification of a metal body by utilizing metal expansion induced by hydrogen absorption of the present invention, hydrogen absorbable metal powder with greater volume expansion after hydrogen absorption is used, the product obtained in the step 4 is used as a processing object, and the steps 1, 2 and 3 are sequentially repeated until the product with the desired density is obtained. The product with a desired density includes a finished product with a density of 99.5% or higher.

According to the method for promoting densification of a metal body by utilizing metal expansion induced by hydrogen absorption of the present invention, during industrial application, the product may be, but not limited to, a not-fully-densified sintering body produced by a powder metallurgy method, a metal or alloy body with residue pores produced by a casting method, a metal or alloy product with inside residue pore defects fabricated by additive manufacturing, a porous metal material requiring surface densification treatment, and a metal-based composite material requiring density improvement or bonding intensity improvement.

Beneficial Effects of the Invention

It is provided for the first time by the present invention that hydrogen absorbable metal blocks or powder is restrained in a sealed space by using the rigid mold, and in the hydrogen absorption process, stress is applied onto a metal product with pores, or hydrogen absorption and/or hydrogen storage metal per se. Under the condition that the volume of a sealed space (mold cavity) is unchanged or the volume change is smaller than the hydrogen absorption expansion volume, the stress causes material deformation and creep age, and inside pores are reduced and closed.

Compared with a traditional powder metallurgy densification technology or a metal plastic processing technology, the present invention has the following advantages.

(1) Near-net shaping is realized. An original complicated shape of a product can be well maintained. The method may be used for densification treatment of processed complicated metal products, additive manufacturing-fabricated products, powder metallurgy sintered products, and powder injection molded products. The advantages of the present invention are more obvious when the structure of the product is more complicated, and the precision requirement is higher.

(2) Production equipment and the mold are simple, the production costs are low, and the efficiency is high.

(3) The process treatment temperature is much lower than a traditional powder densification treatment temperature, crystalline growth during the densification process can be effectively inhibited, fine and uniform microstructures are obtained, and the product performance is improved.

BRIEF DESCRIPTION OF THE DRAWINGS

FIG. 1A shows an assembled mold before the heating and hydrogen introduction. FIG. 1B shows an assembled mold after hydrogen is introduced.

DETAILED DESCRIPTION OF THE EMBODIMENTS

Figures 1A, 1B:
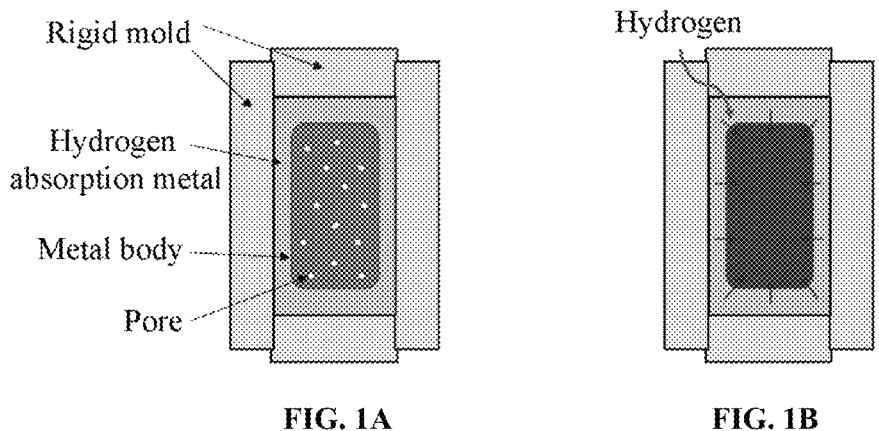
FIGS. 1A-1B show schematic diagrams of a work principle of the present invention.

The present invention will be further illustrated in detail in conjunction with embodiments hereafter.

In the present invention, an encapsulated mold cannot generate component loosening and falling in a heating process.

Embodiment 1

1. A titanium product with a density of 98% (industrial pure titanium, titanium content>98%) was put into a stainless steel mold. Titanium powder with an average size of 45 μm (a filling volume of the titanium powder accounts for 40% of a volume of a mold inner cavity) was fully filled between the product and the mold. The mold was encapsulated and fastened. (Gaps existed between mold modules, and these gaps were good vent holes).
2. The assembled mold was put into a hydrogen furnace, and was heated to 600° C. in vacuum. Hydrogen (the pressure of the hydrogen was 1 bar) was introduced. Hydrogen introduction was maintained. Heat soaking was performed for 10 h.
3. Hydrogen introduction into the hydrogen furnace was stopped. Vacuum pumping was performed (a vacuum degree was less than $10^{-3}$ Pa). A temperature was raised to 750° C. After soaking for 10 h, furnace shut down for cooling was performed.
4. The hydrogen furnace was opened. The mold was taken out and opened. A titanium alloy product with a density of higher than 99.5% was taken out.

Comparative Example 1

Other conditions were all identical to those of Embodiment 1. The difference was that in the step (2), argon was introduced instead of hydrogen. The density of the obtained product had no obvious change.

Embodiment 2

1. A titanium product with a density of 95% (titanium content>20%) was put into a stainless steel mold. Fit between the product and the mold was smaller than 0.1 mm. The mold was encapsulated and fastened. (Gaps existed between mold modules, and these gaps were good vent holes).
2. The assembled mold was put into a hydrogen furnace, and was heated to 600° C. in vacuum. Hydrogen (the pressure of the hydrogen was 10 bar) was introduced. Hydrogen introduction was maintained. Heat soaking was performed for 10 h.
3. Hydrogen introduction into the hydrogen furnace was stopped. Vacuum pumping was performed (a vacuum degree was less than $10^{-3}$ Pa). A temperature was raised to 750° C. After soaking for 10 h, furnace shut down for cooling was performed.
4. The hydrogen furnace was opened. The mold was taken out and opened. A titanium alloy product with a density of higher than 99.5% was taken out.

Comparative Example 2

Other conditions were all identical to those of Embodiment 2. The difference was that in the step (2), argon was introduced instead of hydrogen. The density of the obtained product had no change.

Embodiment 3

1. A copper alloy product with a density of 95% (copper content>60%) was put into a stainless steel mold. Titanium powder with an average size of 45 μm (a filling volume of the titanium powder accounts for 30% of a volume of a mold inner cavity) was filled between the product and the mold. The mold was encapsulated and fastened. (Gaps existed between mold modules, and these gaps were good vent holes).
2. The assembled mold was put into a hydrogen furnace, and was heated to 600° C. in vacuum. Hydrogen (the pressure of the hydrogen was 1 bar) was introduced. Hydrogen introduction was maintained. Heat soaking was performed for 10 h.
3. Hydrogen introduction into the hydrogen furnace was stopped. Vacuum pumping was performed (a vacuum degree was less than $10^{-3}$ Pa). A temperature was raised to 750° C. After soaking for 10 h, furnace shut down for cooling was performed.
4. The hydrogen furnace was opened. The mold was taken out and opened. A copper alloy product with the density of higher than 99% was taken out.

Comparative Example 3

Other conditions were all identical to those of Embodiment 3. The difference was that in the step (2), argon was introduced instead of hydrogen. The density of the obtained product had no change.

Embodiment 4

1. A stainless steel mold was fully filled with titanium alloy powder with an average size of 45 μm (ingredient: Ti-6Al-4V). The mold was encapsulated and fastened. (Gaps existed between mold modules, and these gaps were good vent holes).
2. The assembled mold was put into a hydrogen furnace, and was heated to 600° C. in vacuum. Hydrogen (the pressure of the hydrogen was 1 bar) was introduced. Hydrogen introduction was maintained. Heat soaking was performed for 10 h.
3. Hydrogen introduction into the hydrogen furnace was stopped. Vacuum pumping was performed (a vacuum degree was less than $10^{-3}$ Pa). A temperature was raised to 750° C. After soaking for 10 h, furnace shut down for cooling was performed.
4. The hydrogen furnace was opened. The mold was taken out and opened. A titanium alloy product with a density of higher than 80% was taken out.

Comparative Example 4

Other conditions were all identical to those of Embodiment 4. The difference was that in the step (2), argon was introduced instead of hydrogen. The density of the obtained product had no obvious change.

Embodiment 5

1. An aluminum alloy product with a density of 95% (aluminum content>90%) was put into a stainless steel mold. ZrNi alloy powder with an average size of 60 μm (a filling volume of the ZrNi alloy powder accounts for 40% of a volume of a mold inner cavity) was filled between the product and the mold. The mold was sealed.

2. The assembled mold was put into a hydrogen furnace, and was heated to 200° C. in hydrogen. Hydrogen (the pressure of the hydrogen was 1 bar) was introduced. Heat soaking was performed for 5 h.

3. Hydrogen introduction into the hydrogen furnace was stopped. Vacuum pumping was performed (a vacuum degree was less than $10^{-3}$ Pa). A temperature was raised to 300° C. After soaking for 1 h, furnace shut down for cooling was performed.

4. The hydrogen furnace was opened. The mold was taken out and opened. An aluminum alloy product with a density of higher than 99% was taken out.

Comparative Example 5

Other conditions were all identical to those of Embodiment 5. The difference was that in the step (2), argon was introduced instead of hydrogen. The density of the obtained product had no change.

What is claimed is:

1. A method for promoting densification of a metal body by utilizing metal expansion induced by hydrogen absorption, wherein hydrogen is introduced into a rigid closed mold filled with a hydrogen absorption expansion material or filled with the hydrogen absorption expansion material and a metal material to be densified, and a volume expansion effect of the hydrogen absorption expansion material is used to densify the hydrogen absorption expansion material and/or the metal material to be densified; wherein the method comprises the following steps: step 1: putting a first pre-densified metal body into the rigid closed mold, performing encapsulation and fastening, and reserving a gas opening to obtain a pretreatment assembly, wherein the first pre-densified metal body comprises a metal material with hydrogen absorption capability; in the pretreatment assembly, an outer wall of the first pre-densified metal body is in contact with an inner wall of the rigid closed mold, or a gap exists between the outer wall of the first pre-densified metal body and the inner wall of the rigid closed mold; and the gap is smaller than a linear expansion after the first pre-densified metal body absorbs hydrogen,
or charging a second pre-densified metal body and a hydrogen absorbable metal powder into the rigid closed mold together, performing encapsulation and fastening, and reserving the gas opening to obtain the pretreatment assembly,
or putting the metal material to be densified onto a set position of a mold inner cavity, putting the hydrogen absorbable metal powder onto other positions of the mold inner cavity, performing encapsulation and fastening, and reserving the gas opening to obtain the pretreatment assembly; step 2: putting the pretreatment assembly obtained in the step 1 into a sintering furnace, introducing hydrogen, raising a temperature to a hydrogen absorption temperature, and performing heat soaking to obtain a hydrogenated assembly: then, regulating an atmosphere into an inert atmosphere or a vacuum atmosphere and/or performing heat soaking at a dehydrogenation temperature so that the hydrogenated assembly releases hydrogen to obtain a dehydrogenated assembly; and step 3: after the dehydrogenated assembly is cooled, removing the rigid closed mold to obtain a densified metal body.

2. The method for promoting densification of the metal body according to claim 1, wherein the hydrogen absorption expansion material comprises a metal with hydrogen absorption capability.

3. The method for promoting densification of the metal body according to claim 1, wherein throughout step 2, the rigid closed mold keeps the pretreatment assembly tight and firm without loosening.

4. The method for promoting densification of the metal body according to claim 1, wherein after complete hydrogen absorption by the metal material with hydrogen absorption capability or the hydrogen absorbable metal powder, a volume of the first pre-densified metal body or the hydrogen absorbable metal powder realizes at least more than 5 vol % expansion compared with a volume of the first pre-densified metal body or the hydrogen absorbable metal powder before the hydrogen absorption.

5. The method for promoting densification of the metal body according to claim 1, wherein a material of the rigid closed mold does not react with hydrogen.

6. The method for promoting densification of the metal body according to claim 1, wherein the metal material with hydrogen absorption capability or the hydrogen absorbable metal powder absorbs hydrogen at the hydrogen absorption temperature under a condition that a hydrogen partial pressure is greater than or equal to a hydrogen equilibrium partial pressure of the metal material with hydrogen absorption capability or the hydrogen absorbable metal powder, the hydrogen absorption temperature is determined by physicochemical properties of the metal material with hydrogen absorption capability and/or the hydrogen absorbable metal powder.

7. The method for promoting densification of the metal body according to claim 1, wherein
the metal material with hydrogen absorption capability and/or the hydrogen absorbable metal powder comprise/comprises at least one element of Ti, Mg, Zr, V, Nb, Ta, Pd and rare earth elements.

8. The method for promoting densification of the metal body according to claim 1, wherein step 2 is repeated until a product with a set density is obtained.

9. The method for promoting densification of the metal body according to claim 1, wherein the steps 1, 2 and 3 are sequentially repeated until a product with a set density is obtained.

* * * * *